(12) United States Patent
Li et al.

(10) Patent No.: US 9,637,018 B2
(45) Date of Patent: May 2, 2017

(54) ROAD FOR CHARGING ELECTRIC VEHICLE

(71) Applicants: Ka Fat Li, Hong Kong (HK); Kwok Wah Pun, Hong Kong (HK)

(72) Inventors: Ka Fat Li, Hong Kong (HK); Kwok Wah Pun, Hong Kong (HK)

( * ) Notice: Subject to any disclaimer, the term of this patent is extended or adjusted under 35 U.S.C. 154(b) by 120 days.

(21) Appl. No.: 14/804,356

(22) Filed: Jul. 21, 2015

(65) Prior Publication Data

US 2016/0031337 A1    Feb. 4, 2016

(30) Foreign Application Priority Data

Jul. 29, 2014    (CN) .................... 2014 2 0422312 U (51) Int. Cl.
| | |
|---|---|
| *H02J 7/00* | (2006.01) |
| *B60M 1/00* | (2006.01) |
| *H02G 5/04* | (2006.01) |
| *B60M 1/18* | (2006.01) |
| *B60M 1/30* | (2006.01) |
| *B60L 11/18* | (2006.01) |
| *B60L 5/40* | (2006.01) |
| *B60L 5/38* | (2006.01) |
| *B60L 5/39* | (2006.01) |
| *B60M 1/34* | (2006.01) |

(52) U.S. Cl.
CPC ............ *B60L 11/1824* (2013.01); *B60L 5/38* (2013.01); *B60L 5/39* (2013.01); *B60L 5/40* (2013.01); *B60L 11/1816* (2013.01); *B60M 1/34* (2013.01)

(58) Field of Classification Search
CPC .................................................. B60L 11/1824
USPC ......... 320/107, 109; 191/13, 22 C, 33 R, 35, 191/39
See application file for complete search history.

(56) References Cited

U.S. PATENT DOCUMENTS

| | | | | | |
|---|---|---|---|---|---|
| 4,129,203 | A | * | 12/1978 | Berman | B60L 5/36 104/145 |
| 7,600,621 | B2 | * | 10/2009 | Lohr | B60L 5/40 104/140 |
| 7,748,509 | B2 | * | 7/2010 | Donnard | B60L 5/40 104/140 |
| 8,763,773 | B2 | * | 7/2014 | Asplund | B60L 5/40 191/22 C |
| 9,199,541 | B2 | * | 12/2015 | Asplund | B60L 5/42 |

* cited by examiner

*Primary Examiner* — Richard V Muralidar (57) ABSTRACT

Disclosed is a road for charging electric vehicle. The road includes an electrified rail which includes an electrode plate for connecting an electric plate of the electric vehicle, an insulated cover covering on the plate electrode so as to prevent electric leakage and a neutral layer covering on the insulated cover for connecting a neutral electrode plate of the electric vehicle. The electrode plate includes a first electrode plate and a second electrode plate. The first electrode plate is disposed above the second electrode plate and between the first electrode plate and the second electrode plate there is a gap so that the electric plate of the electric vehicle is able to be sandwiched between the first electrode plate and the second electrode plate while charging. According to the present invention, the road surface is provided with electrified rail, thus the electric vehicle can charge while driving.

20 Claims, 10 Drawing Sheets

ROAD FOR CHARGING ELECTRIC VEHICLE

CROSS-REFERENCE TO RELATED APPLICATIONS

This present invention claims the benefit of Chinese Patent Application No. 201420422312.7, filed on Jul. 29, 2014, the contents of which are hereby incorporated by reference.

FIELD OF THE INVENTION

The present invention relates to roads, and more particularly to a road for charging electric vehicle.

BACKGROUND OF THE INVENTION

Climatic variation, energy and environmental problem are common problems always faced by all of people in the society. As America returns to COP15 (the 15th meeting of contracting party of UN Framework Convention on Climate Change) and the emerging countries, which are represented by China and India, are included, and the main countries aggressively implement the strategy of energy saving and environment protection, the world has entered a new era for solving the common problems always faced by all of people in the society. Greenhouse gas emission, energy consumption and exhaust gas emission are the top three issues in the traffic and transportation field, the effective solution of which directly affects whether the common problems faced by all of people can be solved effectively.

As one of the future trends in automotive field, electric vehicles have been paid worldwide attention presently. Compared with the conventional ICE vehicles, the electric vehicles have better performance on greenhouse gas emission, energy consumption and exhaust. Thus, the electric vehicles become more popular.

However, the electric vehicles have some insurmountable problems, one of which is endurance ability. The conventional ICE vehicles can move ahead immediately as long as fill up the gas tank, but the electric vehicles need more time to charge, which has definitely hindered the widespread application of the electric vehicles.

Figure 1:
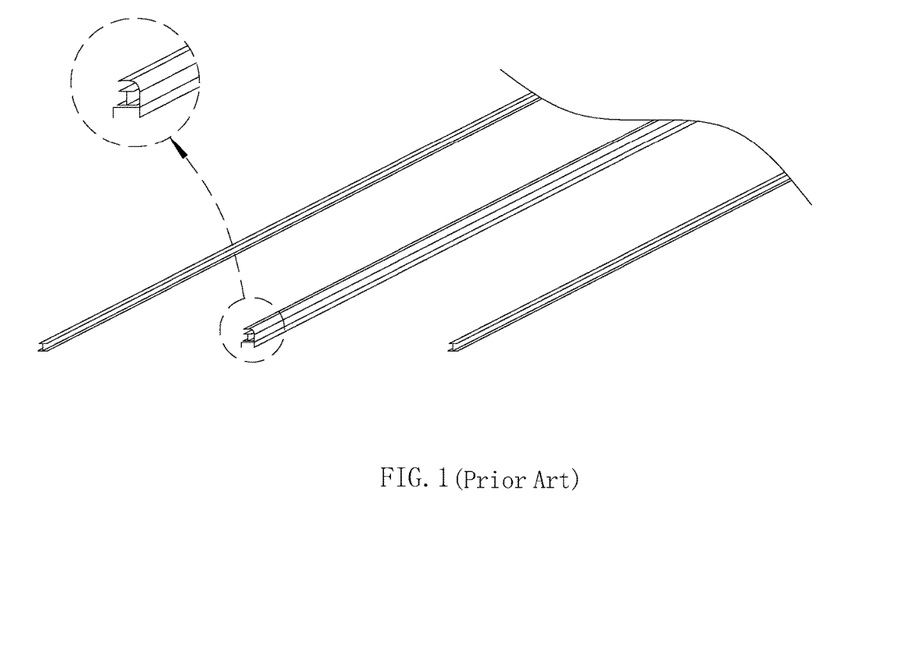
FIG. 1 to FIG. 4 are schematic diagrams of the prior art.
Figure 2:
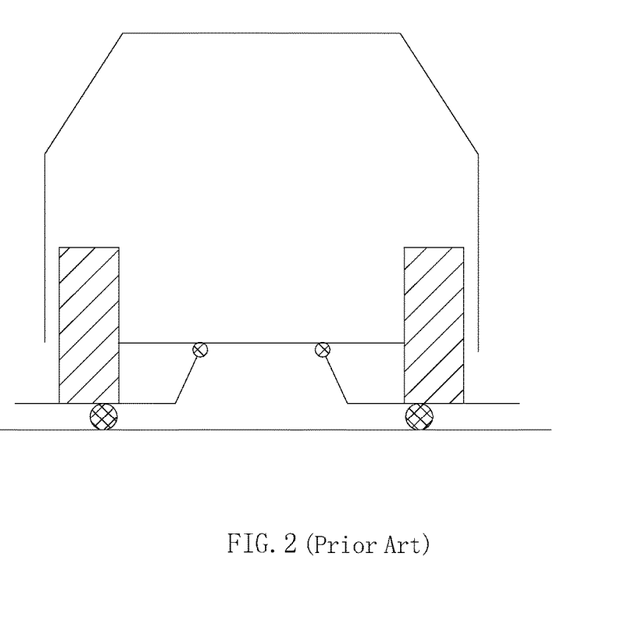

Historical backgrounds of the road for charging electric vehicle will be described as follows:

Early on, the slings fell down because of war, and then the government was forced to build a third rail between the railways as shown in FIG. 1. The third rail was applied high voltage of 700V to 1500V, thus it brought a big hidden danger and it caused many electric shock accidents for years. In USA, it was proposed that a cover was added onto the rail but such a solution still cannot solve the safety problem. At the docks, because the electrified rails were provided for trucks, they were placed under the ground and there needed water pumps to remove the water thereof on the heavy rainy day. But the above method is not suitable for the regular road due to its rough surface. And in China, it was proposed that high-voltage live wires were exposed on the ground and connected with the vehicles on the road (shown in FIG. 2), but it was very dangerous.

Figure 3:
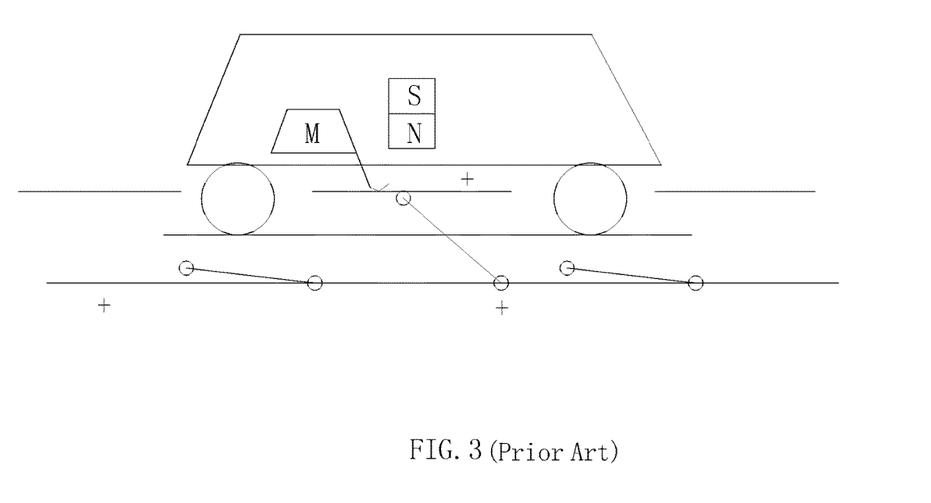

Referring to FIG. 3, in France, somebody attempted to make the live wires be disposed on the road surface section by section. When the vehicle driving right above it, the high voltage electrode buried underground was sucked up via magnetic force and then connected with the bottom of the vehicle so as to charge the vehicle. The people on the road would not touch the high voltage electrode. Such a solution is successful for sunny day, but once a rainy day comes, all of the electrodes will contact with the raining water on the road, which then leads to a trip or the electric power being used for electrolysis of water and which also brings dangers to people on the road.

Figure 4:
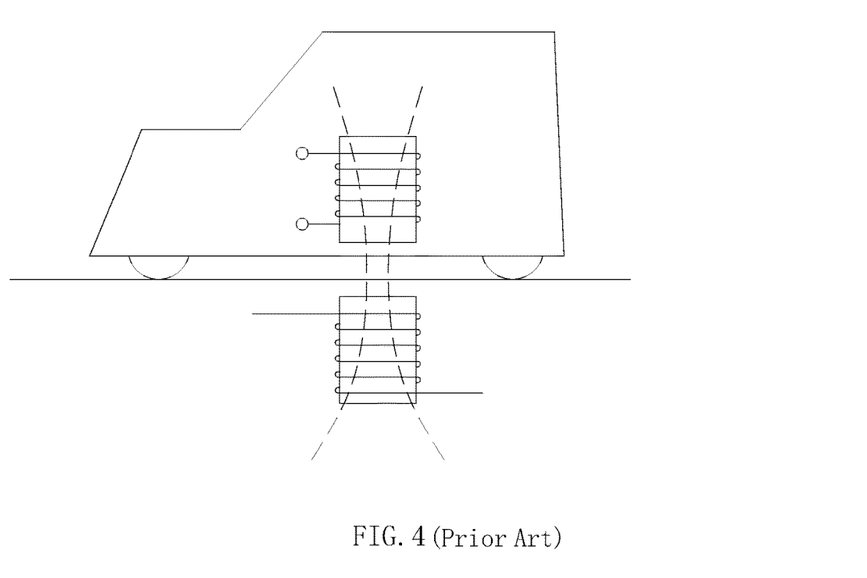

In Korea, Europe and America, somebody attempted to bury expensive charger under the road and then the vehicle could be charged by means of mutual inductance between the charger and another charger disposed in the vehicle. However, the harm to the people caused by such a structure was under study and it could not be popularized. Its structure diagram is shown in FIG. 4.

Recently, a lot of charging posts are rising around the world, however, the charging times of which are still dissatisfying, and most of the charging posts are disposed outside so that they are not suitable for use on a rainy day.

SUMMARY OF THE INVENTION

One object of the present invention is to provide a road for charging electric vehicle so that the electric vehicle can charge while driving, thereby improving the cruising ability of the electric vehicle.

To achieve above objects, there are provided following technical solutions:

A road for charging electric vehicle, includes a road surface and light posts provided on the road surface, wherein the road further comprises an electrified rail which is placed along a driving direction and provided for charging the electric vehicle while driving, the electrified rail comprising an electrode plate for connecting an electric plate of the electric vehicle, an insulated cover covering on the plate electrode so as to prevent electric leakage and a neutral layer covering on the insulated cover for connecting a neutral electrode plate of the electric vehicle, the neutral layer being electrically connected to a neutral loop of alternating current, a cathode wire of direct current or a signal wire of low voltage; the electrode plate comprises a first electrode plate connecting to live wire of electric supply and a second electrode plate connecting to neutral wire of electric supply, the first electrode plate being placed above the second electrode plate and between the first electrode plate and the second electrode plate there being a gap so that the electric plate of the electric vehicle is able to be sandwiched between the first electrode plate and the second electrode plate while charging; and the wire to which the second electrode plate electrically connects and the wire to which the neutral layer electrically connects are able to be interchanged.

Preferably, an elastic element is provided under the second electrode plate so that the electric plate of the electric vehicle is able to be clamped, the elastic element having one end fixed on the road surface and another end fixed on a bottom surface of the second electrode plate.

Preferably, the second electrode plate has a convex side face with upward angle and the electric plate has a convex end surface with downward angle corresponds to the outside surface of the second electrode plate.

Preferably, the electrified rail has two sets of electrode plates.

Preferably, the two sets of electrode plates are symmetrically placed on the electrified rail, the two sets of electrode plates being electrically connected to two electric plates of the same electric vehicle, respectively, or the two sets of electrode plates being electrically connected to two electric plates of two electric vehicles driving in opposite direction, respectively, or the two sets of electrode plates being electrically connected to two electric plates of the same electric vehicle so as to constitute a polyphase supply mode.

Preferably, the electrified rail further comprises a water-retaining embankment for preventing water from entering into the electrified rail, the water-retaining embankment being disposed under the insulated cover and between the water-retaining embankment and the insulated cover there is a gap provided for allowing the electric plate of the electric vehicle to pass.

Preferably, the road surface is an inclined surface on which the vehicle drives, the electrified rail being disposed on higher level of the road surface.

Preferably, the road surface is provided with road rails for railway vehicle and the electrified rail is located between the road rails.

Preferably, the electrified rail is disconnected at the junction of different road rails and the end part of the electrified rail close to the juncture of different rails is heightened.

Preferably, the electrified rail is placed between two adjacent light posts on the road surface and fixed on a higher position thereof for providing power for large vehicle.

Compared with the prior art, the present invention has following beneficial effects:

According to the present invention, the road surface is provided with electrified rail, and the electric vehicle can charge by means of inserting its electric plate into the electrified rail and keep driving with the electric plate. Thus the electric vehicle can charge while driving, thereby improving the cruising ability of the electric vehicle. In addition, the electrified rail is provided with insulated cover so as to avoid accidents of electric shock and prevent the rainwater from entering into the electrified rail, and then reduce the possibility of electric leakage.

DETAILED DESCRIPTION OF ILLUSTRATED EMBODIMENTS

For understanding the technical content of the present invention more sufficiently, some embodiments of the present invention will be described as follows, by way of example only, with reference to the accompanying drawings.

The First Embodiment

FIG. 5 to FIG. 8 illustrate the detailed structure of the present invention according to the first embodiment.

According to the first embodiment, the road for charging electric vehicle includes road surface 100, light posts on the road surface 100 and electrified rail 10 placed along a driving direction and provided for charging the electric vehicle while driving. The first embodiment is mainly applied on electric cars.

Figure 5:
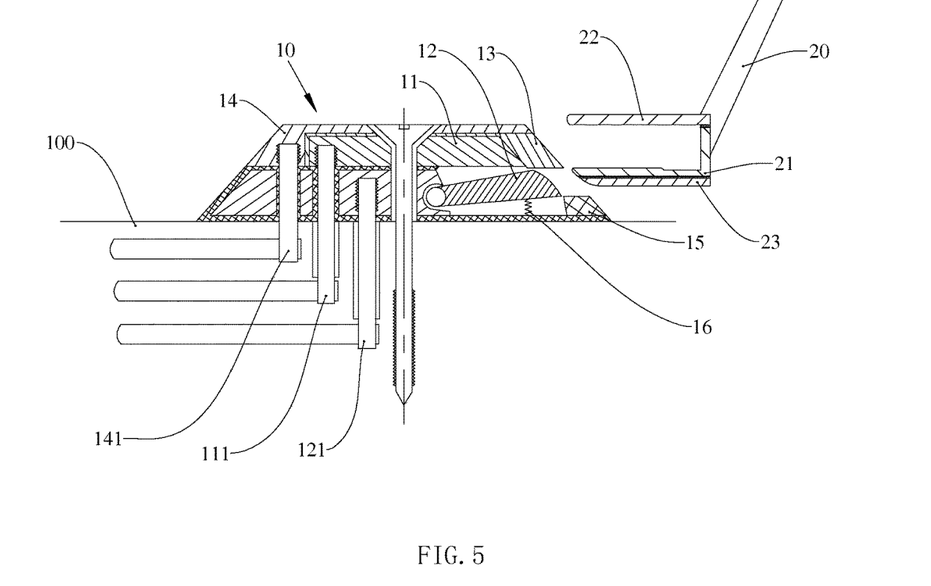
FIG. 5 is a section view of an electrified rail and an electric plate according to a first embodiment.

The electrified rail 10 includes electrode plate for connecting electric plate 21 of the electric vehicle 30 and insulated cover 13 covering on the plate electrode so as to prevent electric leakage. The electrode plate includes first electrode plate 11 and second electrode plate 12. The first electrode plate 11 connects to live wire of electric supply and the second electrode plate 12 connects to neutral wire of electric supply. The first electrode plate 11 is placed above the second electrode plate 12 and between the first electrode plate 11 and the second electrode plate 12 there is a gap so that the electric plate 21 of the electric vehicle 30 is able to be sandwiched between the first electrode plate 11 and the second electrode plate 12 while the electric vehicle 30 charging. A neutral electrode plate 22 and a bottom electrode plate 23 are provided on the electric plate 21. A neutral layer 14 covering on the insulated cover is provided for connecting the neutral electrode plate 22 of the electric vehicle 30 and the neutral layer 14 is electrically connected to a neutral loop of alternating current. In other embodiments, the neutral layer could electrically connect to a cathode wire of direct current or a signal wire of low voltage. The road surface 100 is an inclined surface on which the vehicle drives. The electrified rail 10 is disposed on higher level of the road surface 100. There is an insulated layer 112 between the first electrode plate 11 and the second electrode plate 12, an insulated layer 114 between the first electrode plate 11 and the neutral layer 14, and an insulated layer 120 between the second electrode plate 12 and the road surface 100.

The neutral layer 14 connects to the road surface via metal post 141. The first electrode plate 11 and the second electrode plate 12 electrically connect electric supply via electric post 111 and 121, respectively. The first electrode plate 11 connects to live wire of electric supply and the second electrode plate 12 connects to neutral wire of electric supply. Parts of the electric post 111 and 121 which are inserted to the road surface could be covered with insulated material. In other embodiments, the wire to which the second electrode plate electrically connects and the wire to which the neutral layer electrically connects could be interchanged.

The second electrode plate 12 contacts with the bottom electrode plate 23 of the electric plate 21 thus there is an elastic element 16 provided under the second electrode plate 12 so that bottom electrode plate 23 of the electric plate 21 could be clamped. The elastic element 16 has one end fixed on the road surface 100 and another end fixed on a bottom surface of the second electrode plate 12. The elastic element 16 could be pressure spring.

The second electrode plate 12 has a convex side face with upward angle and the electric plate 21 has a convex end surface with downward angle corresponds to the outside surface of the second electrode plate, thereby reducing the resistance produced when the electric plate 21 being inserted into the gap between the first electrode plate 11 and the second electrode plate 12 and then extending service life thereof.

The electrified rail 10 further includes a water-retaining embankment for preventing water from entering into the electrified rail 10. The water-retaining embankment 15 is disposed under the insulated cover 13 and between the water-retaining wall 15 and the insulated cover 13 there is a gap provided for allowing the electric plate 21 of the electric vehicle 30 to pass.

Figure 6:
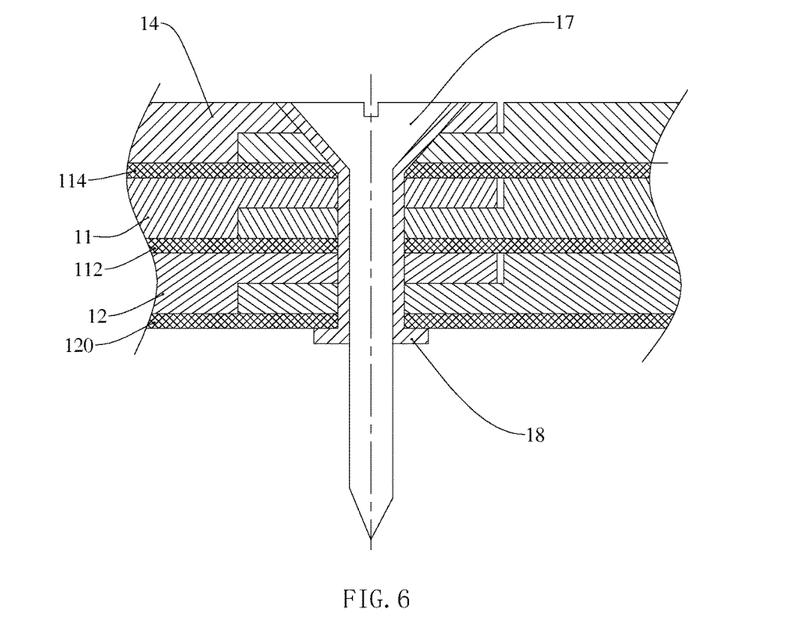
FIG. 6 is a schematic diagram of the electrified rail according to the first embodiment.

In the first embodiment, the electrified rail 10 is composed of multiple segments of rails, all of which are placed on the road section by section. Referring to FIG. 6 which shows the junction of the rails. All of the layers of the electrified rail 10 are fixed on the road surface via a vertical fixed post 17 which is covered with insulator 18. There leaves a gap between the fixed post 17 and the insulator 18 to fit thermal expansion and cold shrinkage.

Figure 7:
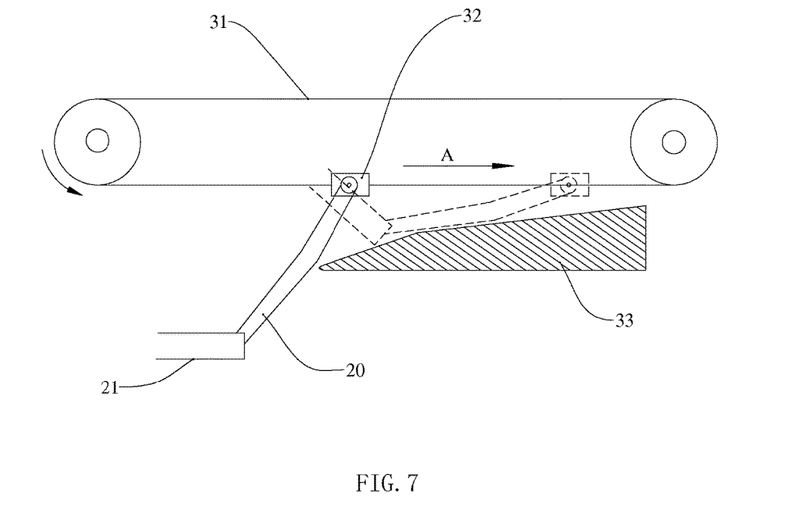
FIG. 7 is a schematic diagram showing that the electric plate of the electric vehicle is folded and unfolded according to the first embodiment.
Figure 8:
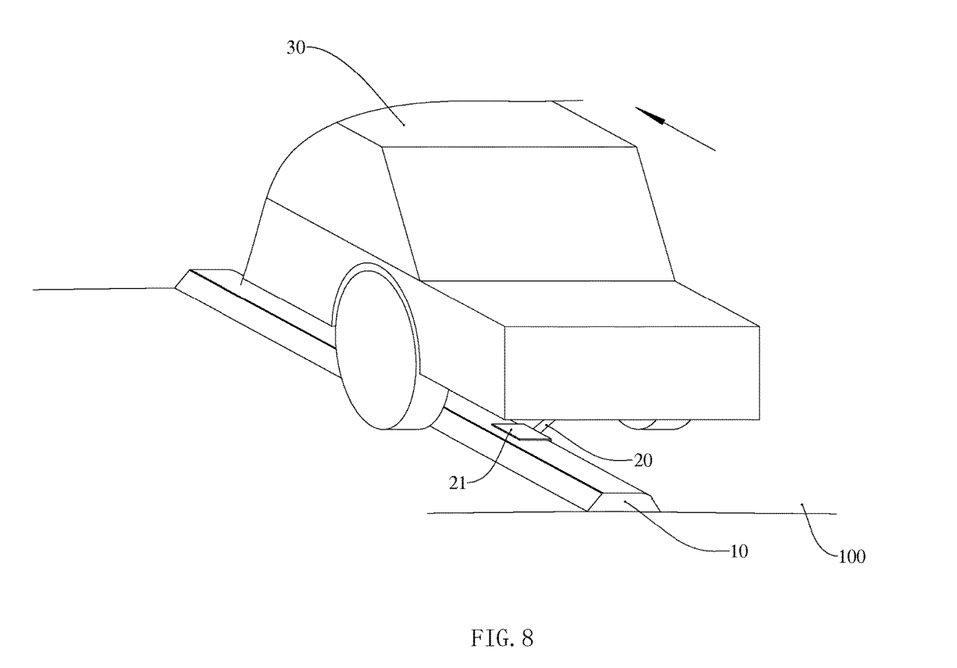
FIG. 8 is a schematic diagram showing that the electric vehicle is charging while driving on the road according to the first embodiment.

According to the first embodiment, the electrified rail 10 is applied for electric cars. As shown in FIG. 7 and FIG. 8, the electric car 30 is connected with the electric plate 21 via an extending arm 20. Referring to FIG. 7, it shows how the extending arm 20 moves. The electric vehicle 30 is provided with a conveyor belt 31 on which a fixed block 32 is fixed and the upper end of the extending arm 20 is hinged with the fixed block 32, thus the upper end of the extending arm 20 is driven by the conveyor belt 31 to move back and forth and laterally. Additionally, the electric vehicle 30 is further provided with a bearing plate 33 which is placed under the conveyor belt 31 for putting away the extending arm 20 and the electric plate 21. The bearing plate 33 has an inclined upper surface. When the upper end of the extending arm 20 moves in direction A following the motion of the conveyor belt 31, the extending arm 20 and the electric plate 21 will be put away due to the restriction of the upper surface of the bearing plate 33. It should be noted that the extending arm 20 and the electric plate 21 will not make an interference with the conveyor belt 31 when they are put away, because the electric plate 21 and the conveyor belt 31 are not placed in the same location along the bodywork length direction.

The Second Embodiment

Figure 9:
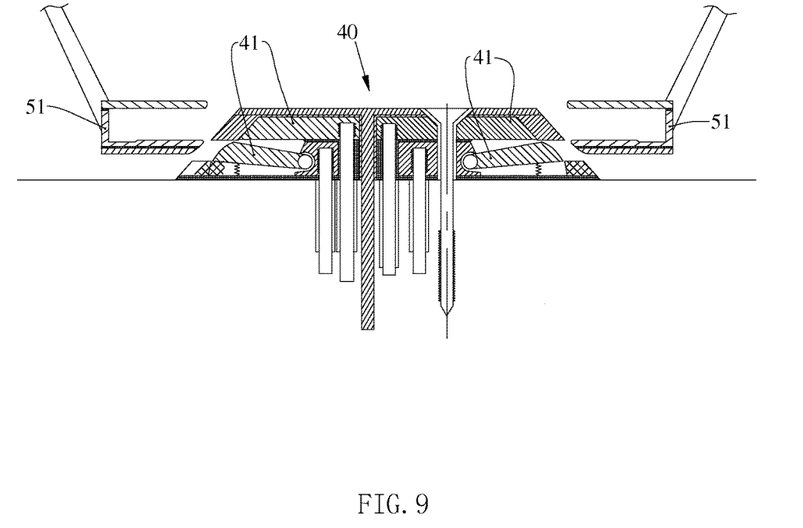
FIG. 9 is a section view of an electrified rail and an electric plate according to a second embodiment.
Figure 10:
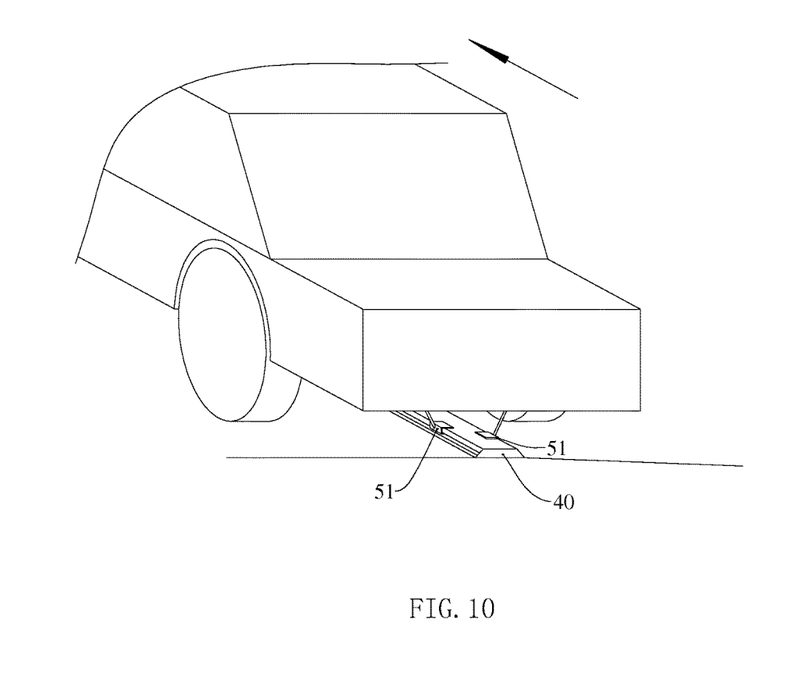
FIG. 10 is a schematic diagram showing that the electric vehicle is charging while driving on the road according to the second embodiment.
Figure 11:
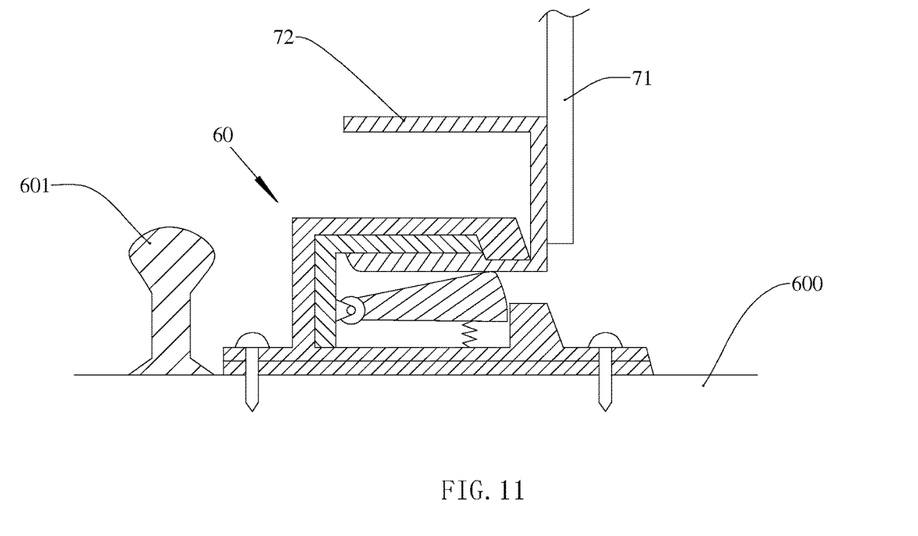
FIG. 11 is a section view of an electrified rail and an electric plate according to a third embodiment.
Figure 12:
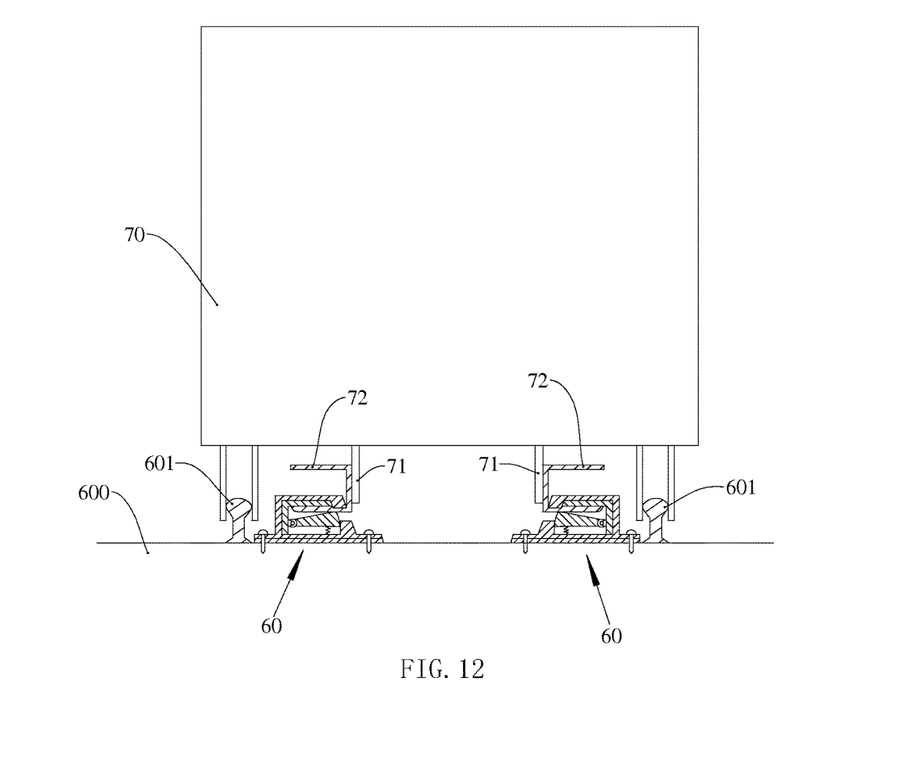
FIG. 12 is a schematic diagram showing that a railway vehicle is charging while driving according to the third embodiment.
Figure 13:
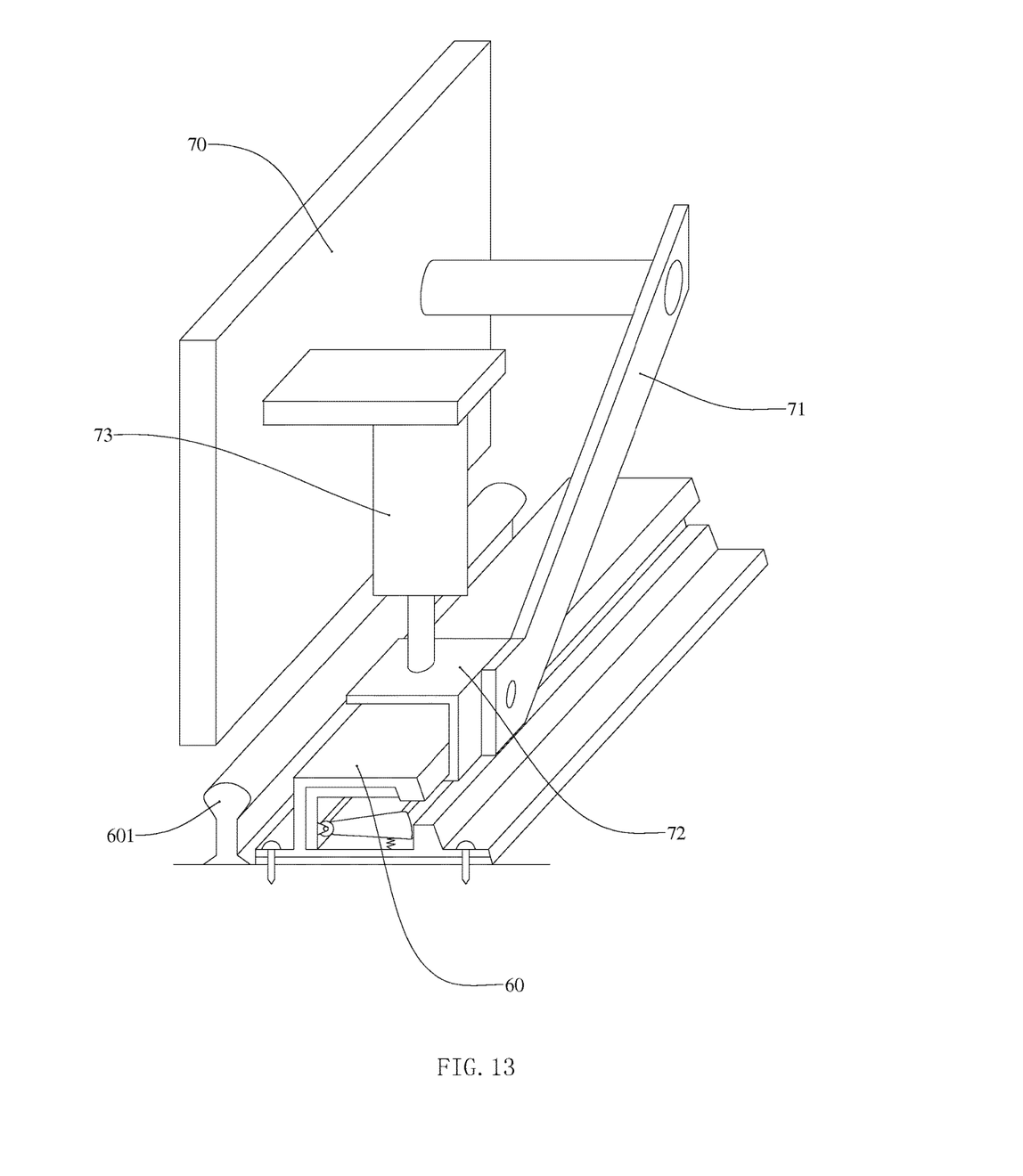
FIG. 13 is a perspective view showing that the electric plate of the railway vehicle is inserted into the electrified rail according to the third embodiment.

FIG. 9 and FIG. 10 illustrate the detailed structure of the present invention according to the second embodiment. Compared with the first embodiment, the second embodiment has following different structure: the electrified rail 40 has two sets of electrode plates 41 which can electrically connect to two electric plates 51 of the same electric vehicle, respectively, thereby increasing the charging current and then shortening the charging time.

In other embodiment, the two sets of electrode plates are electrically connected to two electric plates of two electric vehicles driving in opposite direction, respectively. Only one electrified rail is needed to charge the electric vehicles driven on both sides of the electrified rail, thereby reducing the cost. At the same time, such an electrified rail can meet the requirements of driven on the left system and driven on the right system.

In other embodiment, the two sets of electrode plates are electrically connected to two electric plates of the same electric vehicle so as to constitute a polyphase supply mode.

The Third Embodiment

Figure 14:
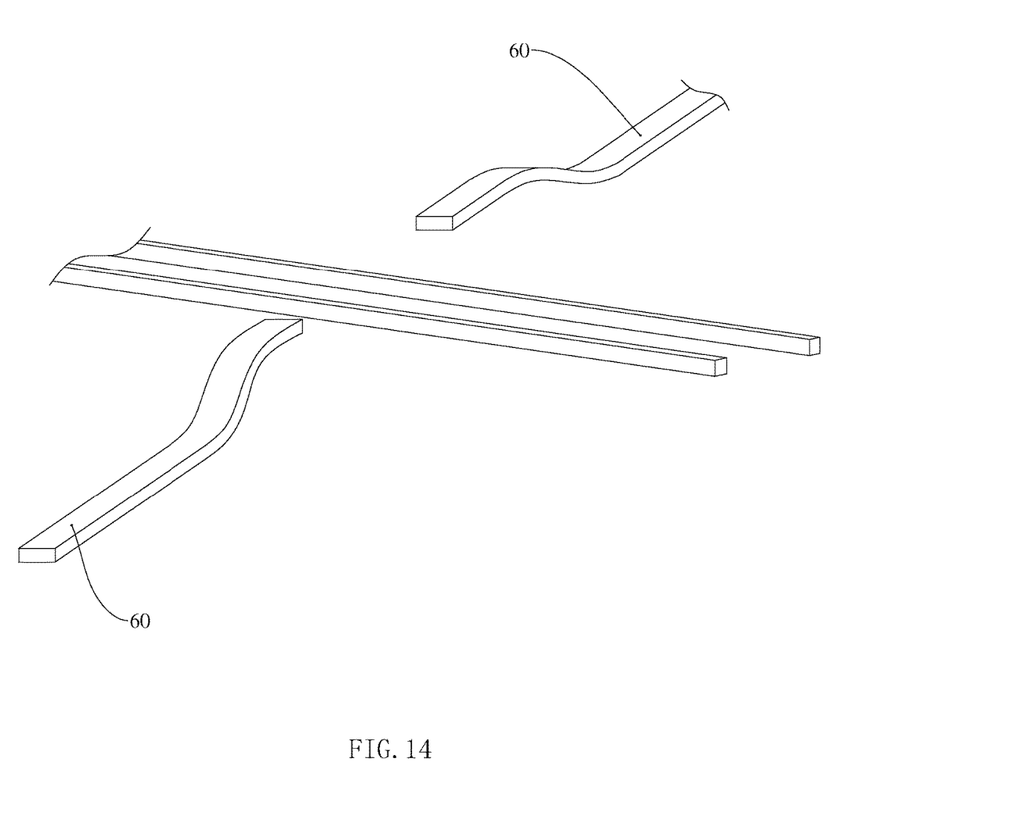
FIG. 14 is a schematic diagram showing the electrified rails located on the juncture of different rails according to the third embodiment.

FIG. 11 to FIG. 14 show a detailed structure of the third embodiment which is mainly applied on railway vehicles. Compared with the first embodiment, the third embodiment has following different structure: the road surface 600 is provided with road rails 601 for the railway vehicles 70; there are two electrified rails 60 located between the road rails 601 asymmetrically and on the inner side of the road rails 601; the electric plate 72 connects to the bodywork of the railway vehicles 70 via an extending arm 71 which has an upper end hinged with the bodywork and a lower end hinged with the electric plate 72; additionally, the top portion of the electric plate 72 connects to the bodywork of the railway vehicles 70 via a hydraulic arm 73. The hydraulic arm 73 has two roles-first, connecting the electric plate 72 and the electrified rail 60 and second, putting away the electric plate 72 so as to prevent the electric plate 72 from hitting the road rails at the junction of different rails. As shown in FIG. 14, the electrified rail 60 is disconnected at the junction of different road rails and the end part of the electrified rail 60, which is close to the juncture of different rails, is heightened up to several centimeters, such as approximately 5 cm.

In other embodiments, only one electrified rail is provided and it is placed on a central location between the two road rails or placed on a location close to one of the road rails.

In other embodiments, the hydraulic arm could be replaced with tension spring.

The Fourth Embodiment

Figure 15:
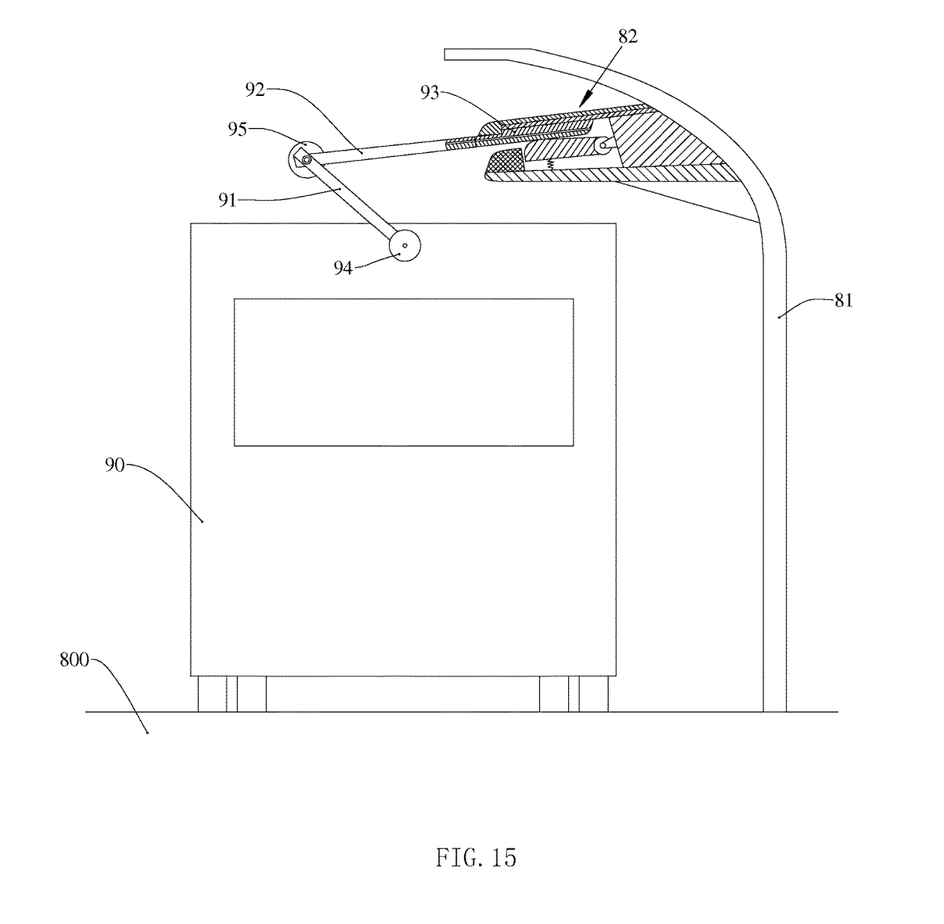
FIG. 15 is a section view of an electrified rail and an electric plate according to a fourth embodiment.
Figure 16:
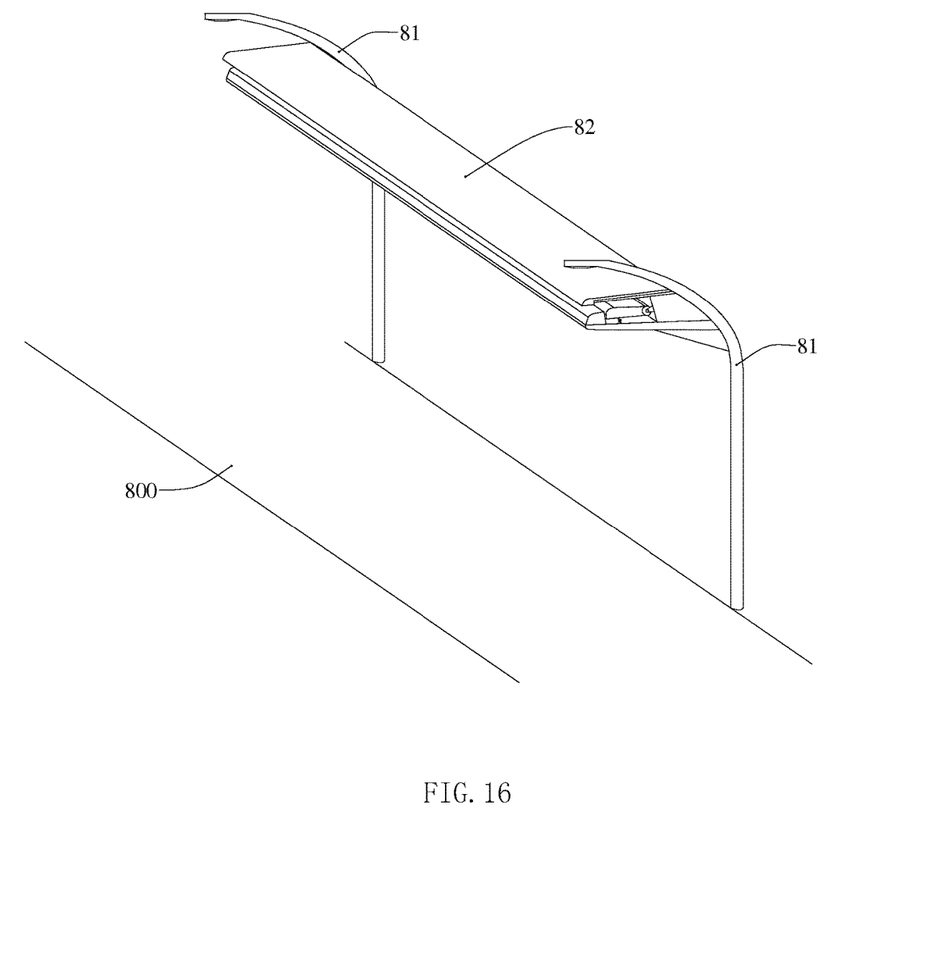
FIG. 16 is a schematic diagram showing that the electrified rail is fixed on the adjacent light posts according to the fourth embodiment.

FIG. 15 to FIG. 16 show a detailed structure of the fourth embodiment which is mainly applied on large vehicles, such as buses. Compared with the first embodiment, the fourth embodiment has following different structure: the electrified rail 82 is placed between two adjacent light posts 81 on the road surface 800 and fixed on a higher position thereof. According to the fourth embodiment, the electrified rail 82 could be placed only on the light posts 81 which are close to the crossroads for charging of the large vehicles stopped at a red light. In other embodiments, the electrified rails 82 are continuously placed on all of the light posts 81 on the road 800, thus the electric vehicle can charge during driving.

As shown in FIG. 15, the large vehicle 90 connects with the electric plate 93 via a retracted mechanical arm which includes a short arm 91 and a long arm 92. The long arm 92 is rotatably attached to the short arm 91 and the short arm 91 is rotatably attached to the bodywork of the large vehicle 90. There is a first motor 94 provided on the bodywork to control the rotation of the short arm 91 and a second motor 95 provided on the junction of the short arm 91 and the long arm 92 to control the rotation of the long arm 92.

Above descriptions of embodiments are provided for further illustrating the technical content of the present invention, so as to facilitate understanding and it should be understood that the invention is not to be limited to the disclosed embodiments. Any technique extension and recreation according to the present invention should be included within the scope of protection of the invention.

What is claimed is:

1. A road for charging electric vehicle, comprising a road surface and light posts provided on the road surface, wherein the road further comprises an electrified rail which is placed along a driving direction and provided for charging the electric vehicle while driving, the electrified rail comprising an electrode plate for connecting an electric plate of the electric vehicle, an insulated cover covering on the plate electrode so as to prevent electric leakage and a neutral layer covering on the insulated cover for connecting a neutral electrode plate of the electric vehicle, the neutral layer being electrically connected to a neutral loop of alternating current, a cathode wire of direct current or a signal wire of low voltage; the electrode plate comprises a first electrode plate connecting to live wire of electric supply and a second electrode plate connecting to neutral wire of electric supply, the first electrode plate being placed above the second electrode plate and between the first electrode plate and the second electrode plate there being a gap so that the electric plate of the electric vehicle is able to be sandwiched between the first electrode plate and the second electrode plate while charging; and the wire to which the second electrode plate electrically connects and the wire to which the neutral layer electrically connects are able to be interchanged.

2. The road for charging electric vehicle according to claim 1, wherein an elastic element is provided under the second electrode plate so that the electric plate of the electric vehicle is able to be clamped, the elastic element having one end fixed on the road surface and another end fixed on a bottom surface of the second electrode plate.

3. The road for charging electric vehicle according to claim 1, wherein the second electrode plate has a convex side face with upward angle and the electric plate has a convex end surface with downward angle corresponds to the outside surface of the second electrode plate.

4. The road for charging electric vehicle according to claim 1, wherein the electrified rail has two sets of electrode plates.

5. The road for charging electric vehicle according to claim 4, wherein the two sets of electrode plates are symmetrically placed on the electrified rail, the two sets of electrode plates being electrically connected to two electric plates of the same electric vehicle, respectively, or the two sets of electrode plates being electrically connected to two electric plates of two electric vehicles driving in opposite direction, respectively, or the two sets of electrode plates being electrically connected to two electric plates of the same electric vehicle so as to constitute a polyphase supply mode.

6. The road for charging electric vehicle according to claim 1, wherein the electrified rail further comprises a water-retaining embankment for preventing water from entering into the electrified rail, the water-retaining embankment being disposed under the insulated cover and between the water-retaining embankment and the insulated cover there is a gap provided for allowing the electric plate of the electric vehicle to pass.

7. The road for charging electric vehicle according to claim 1, wherein the road surface is an inclined surface on which the vehicle drives, the electrified rail being disposed on higher level of the road surface.

8. The road for charging electric vehicle according to claim 2, wherein the road surface is an inclined surface on which the vehicle drives, the electrified rail being disposed on higher level of the road surface.

9. The road for charging electric vehicle according to claim 3, wherein the road surface is an inclined surface on which the vehicle drives, the electrified rail being disposed on higher level of the road surface.

10. The road for charging electric vehicle according to claim 4, wherein the road surface is an inclined surface on which the vehicle drives, the electrified rail being disposed on higher level of the road surface.

11. The road for charging electric vehicle according to claim 5, wherein the road surface is an inclined surface on which the vehicle drives, the electrified rail being disposed on higher level of the road surface.

12. The road for charging electric vehicle according to claim 6, wherein the road surface is an inclined surface on which the vehicle drives, the electrified rail being disposed on higher level of the road surface.

13. The road for charging electric vehicle according to claim 1, wherein the road surface is provided with road rails for railway vehicle and the electrified rail is located between the road rails.

14. The road for charging electric vehicle according to of claim 13, wherein the electrified rail is disconnected at the junction of different road rails and the end part of the electrified rail close to the juncture of different rails is heightened.

15. The road for charging electric vehicle according to claim 1, wherein the electrified rail is placed between two adjacent light posts on the road surface and fixed on a higher position thereof for providing power for large vehicle.

16. The road for charging electric vehicle according to claim 2, wherein the electrified rail is placed between two adjacent light posts on the road surface and fixed on a higher position thereof for providing power for large vehicle.

17. The road for charging electric vehicle according to claim 3, wherein the electrified rail is placed between two adjacent light posts on the road surface and fixed on a higher position thereof for providing power for large vehicle.

18. The road for charging electric vehicle according to claim 4, wherein the electrified rail is placed between two adjacent light posts on the road surface and fixed on a higher position thereof for providing power for large vehicle.

19. The road for charging electric vehicle according to claim 5, wherein the electrified rail is placed between two adjacent light posts on the road surface and fixed on a higher position thereof for providing power for large vehicle.

20. The road for charging electric vehicle according to claim 6, wherein the electrified rail is placed between two adjacent light posts on the road surface and fixed on a higher position thereof for providing power for large vehicle.

* * * * *